United States Patent
Hu et al.

(10) Patent No.: US 7,196,833 B2
(45) Date of Patent: Mar. 27, 2007

(54) APPARATUS FOR SIMULTANEOUS OTDM DEMULTIPLEXING, ELECTRICAL CLOCK RECOVERY AND OPTICAL CLOCK GENERATION, AND OPTICAL CLOCK RECOVERY

(75) Inventors: Zhaoyang Hu, Santa Barbara, CA (US); Kohsuke Nishimura, Kamifukuoka (JP); Hsu-Feng Chou, Santa Barbara, CA (US); Daniel J. Blumenthal, Santa Barbara, CA (US); John E. Bowers, Santa Barbara, CA (US); Ryo Inohara, Kamifukuoka (JP); Masashi Usami, Kamifukuoka (JP)

(73) Assignees: KDDI R&D Laboratories, Inc., Kamifukuoka (JP); The Regents of the University of California, Oakland, CA (US)

( * ) Notice: Subject to any disclaimer, the term of this patent is extended or adjusted under 35 U.S.C. 154(b) by 0 days.

(21) Appl. No.: 11/208,571

(22) Filed: Aug. 23, 2005

(65) Prior Publication Data
US 2006/0056853 A1    Mar. 16, 2006

(51) Int. Cl.
*G02B 26/00* (2006.01)
*G02F 1/01* (2006.01)
(52) U.S. Cl. .................. 359/238; 359/245; 398/155
(58) Field of Classification Search ............... 359/238
See application file for complete search history.

(56) References Cited

U.S. PATENT DOCUMENTS

| | | | | |
|---|---|---|---|---|
| 5,706,113 A | * | 1/1998 | Kawanishi et al. | ......... 398/212 |
| 5,999,287 A | * | 12/1999 | Davies et al. | ................. 398/98 |
| 6,396,856 B1 | * | 5/2002 | Sucha et al. | .................. 372/25 |
| 2003/0147574 A1 | * | 8/2003 | Lam et al. | ...................... 385/1 |
| 2004/0033004 A1 | * | 2/2004 | Welch et al. | ................. 385/14 |

FOREIGN PATENT DOCUMENTS

| JP | 10-78595 | 3/1998 |
|---|---|---|
| JP | 11-38371 | 2/1999 |

OTHER PUBLICATIONS

B. Mikkelsen, et al., "160 Gb/s TDM Transmission Systems", pp. 125-127, ECOC 2000.
Jianjun Yu, et al. "Simultaneous Demultiplexing and Clock Recovery of 80 Gb/s OTDM Signals Using a Tandem Electro-absorption Modulator", 2001 IEEE, pp. 358-359.

* cited by examiner

*Primary Examiner*—Jordan Schwartz
*Assistant Examiner*—Jessica Stultz
(74) *Attorney, Agent, or Firm*—Oblon, Spivak, McClelland, Maier & Neustadt, P.C.

(57) ABSTRACT

An apparatus for simultaneous OTDM demultiplexing, electrical clock recovery and optical clock generation, and optical clock recovery using a traveling-wave electroabsorption modulator. The apparatus includes a TW-EAM and a PLL coupled thereto. The TW-EAM includes a first, a second, a third, and a fourth. The first port is used for an optical input and the third port is used for optical output. The second port is coupled to an input, and the fourth port is coupled to an output, of the PLL. When the first port receives optical input, the second port produces a photocurrent to be applied to the PLL, and the fourth port receives a recovered clock produced by the PLL, and the third port produces demultiplexed data and an optical clock. Using the same configuration, the apparatus produces a recovered optical clock signal.

7 Claims, 8 Drawing Sheets

US 7,196,833 B2

APPARATUS FOR SIMULTANEOUS OTDM DEMULTIPLEXING, ELECTRICAL CLOCK RECOVERY AND OPTICAL CLOCK GENERATION, AND OPTICAL CLOCK RECOVERY

PRIORITY CLAIM

Priority is claimed on U.S. patent application Ser. No. 10/800,625, filed Mar. 16, 2004, and provisional U.S. Patent Application Nos. 60/458,078, filed Mar. 26, 2003, and 60/459,667, filed Apr. 1, 2003, the entire contents each of which are incorporated herein by reference.

COPYRIGHT RIGHTS

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The invention relates to an apparatus for simultaneous OTDM demultiplexing, electrical clock recovery and optical clock generation, and to an apparatus for optical clock recovery, using a traveling-wave electroabsorption modulator.

2. Description of Related Art

Demultiplexing, add/drop, regeneration, clock recovery and synchronization are the key functions required within an optical time-division multiplexing (OTDM) network node. The ability to demultiplex a single channel from a high-speed OTDM data stream and achieve clock recovery to ensure correct synchronization of all data channels is significant at a network node for further switching and detection processes. It is desirable to simultaneously perform demultiplexing and clock recovery using a single device to reduce the cost and complexity of the network node. However, the possible problems of the ambiguity and the crosstalk could occur in the single one device that is employed for multiple different purposes at the same time.

Examples of prior attempts to implement simultaneous demultiplexing and clock recovery were made by B. Mikkelsen, G. Raybon, R.-J. Essiambre, "160 Gb/s TDM Transmission Systems," Paper 6.1.1, pp. 125–128, ECOC 2000, and J. Yu, K. Kojima, N. Chand, "Simultaneous Demultiplexing and Clock Recovery of 80 Gb/s OTDM Signals Using a Tandem Electro-absorption Modulator," PDI, pp. 2–3, LEOS 2001.

The ability to generate an optical clock from a high-speed optical time-division multiplexed (OTDM) data stream and ensure correct synchronization is significant in an OTDM network node for all-optical 3R (i.e., re-generation). However, usually, it is necessary for realizing optical clock recovery that an additional photodetector is required to detect the data information and an additional pulse generator is required to produce the optical clock.

FIG. 15 shows a third example of the related art where discrete components for optical clock recovery are used. Data light, which is light having data therein, comes in through a fiber to a clock recovery device (CR). The CR has a function of a photodetector and produces an electrical clock signal. The electrical clock signal is supplied to an external intensity modulator (MOD). One example for the MOD is a TW-EAM. On the other hand, a laser diode (LD) radiates a laser beam to the MOD where the laser beam is modulated by the electrical clock signal. As a result, the MOD generates an optical clock signal.

FIG. 16 shows a fourth example of the related art where discrete components for demultiplexed data recovery are used. Data light signal having a bit rate of 40 Gb/s data stream impinges on a photodetector (PD) and an electroabsorption modulator (EAM). In response to the data light, the PD produces a photocurrent to be supplied to a phase-locked loop (PLL), which in turn outputs an electrical clock. The electrical clock has a frequency derived by dividing a fundamental frequency of the bit rate of the data stream by, for example, 4, namely 10 GHz that is applied to the EAM. The EAM produces a bit rate of 10 Gb/s data stream. Also in the fourth example, discrete components of the PD and the EAM are used.

Clock recovery for a signal other than a traveling wave can be explained by, for example, Japanese Patent Publication Hei 11-38371 disclosed Feb. 12, 1999 (Japanese Patent Application Hei 9-189748 filed Jul. 15, 1997). The Publication uses pulsed light as an input signal to be fed into a semiconductor light modulator. The modulator generates a photocurrent that is applied to a circulator. Regarding pulsed light other than a traveling wave (TW), a circulator is used, but is expensive. On the other hand, a traveling wave does not need an expensive circulator. In addition, a traveling wave can be used to produce an electrical clock that is accurately synchronized with the traveling wave.

Although a TW-EAM is used as a MOD, the TW-EAM is used to only absorb and pass incoming light, i.e., is used to modulate the intensity of the incoming light.

Thus, there is a need for one device with respect to a traveling wave that has the functions of both a photodetector and a modulator, and extracts a clock in incoming data light in addition to absorption and passing of the data light.

SUMMARY OF THE INVENTION

The invention is a new compact scheme of simultaneous demultiplexing, electrical clock recovery and optical clock generation for OTDM signals. The invention described herein presents a new concept of utilizing independent electrical frequency division to fulfill simultaneous demultiplexing, electrical clock recovery and optical clock generation in the same one traveling-wave electroabsorption modulator (TW-EAM) without the ambiguity and the crosstalk problems. The photocurrent of the TW-EAM is employed to detect the data information, and then different independent electrical frequency components are simultaneously used for recovering the electrical clock through a phase-lock loop (PLL), demultiplexing and optical clock generation, respectively. Accordingly, the TW-EAM works simultaneously as a photodetector, a demultiplexer, and an optical pulse generator. The invention exploits the devices multiple functionalities that allow the number of high-speed components within an OTDM network node to be reduced, therefore increasing reliability, whilst also substantially reducing costs.

Furthermore, the invention can be extended to two aspects as follows:

(1) Although limited bandwidth of the TW-EAM could restrict the bit rate increase of the incoming OTDM data stream, an assistant mechanism, such as extra EAMs or semiconductor optical amplifiers (SOAs), can be introduced to intentionally produce the desired tones in the photocurrent of the TW-EAM because the TW-EAM only detects the intensity of the incoming OTDM data. Thus, the scheme can be extended to the application of ultra-high speed OTDM system.

(2) More functionalities in a single TW-EAM could be achieved simultaneously when the dimensions of the TW-EAM such as bidirectionality and states of polarization are further employed.

Moreover, the invention is another new scheme to achieve optical clock recovery that the photocurrent in a traveling-wave electroabsorption modulator (TW-EAM) is used to detect the data information and then the recovered electrical clock from a phase-lock loop (PLL) is employed to modulate the TW-EAM.

The invention exploits the low-cost implementation of optical clock recovery by using a TW-EAM with two electrical ports and two optical ports wherein the TW-EAM can work as a photodiode and pulse generator simultaneously. On one hand, the photocurrent of the TW-EAM detects the data information that is then employed for recovering the electrical clock through the PLL. On the other hand, the electrical recovery clock is used to modulate the TW-EAM and generate an optical clock at another wavelength. Accordingly, the TW-EAM works as a photodiode and a pulse generator simultaneously so that the number of the required components for optical clock recovery can be reduced, thereby substantially reducing the cost.

Further aspects of the invention will be brought out in the following portions of the specification, wherein the detailed description is for the purpose of fully disclosing preferred embodiments of the invention without placing limitations thereon.

DETAILED DESCRIPTION OF THE INVENTION

The invention presents a new scheme for simultaneous OTDM signal demultiplexing, electrical clock recovery and optical clock generation using single one TW-EAM in order to reduce the cost and complexity of the network node. Except that the TW-EAM works as a compact demultiplexing receiver, another possible application is to convert high bit rate OTDM data to low bit rate.

Figure 1:
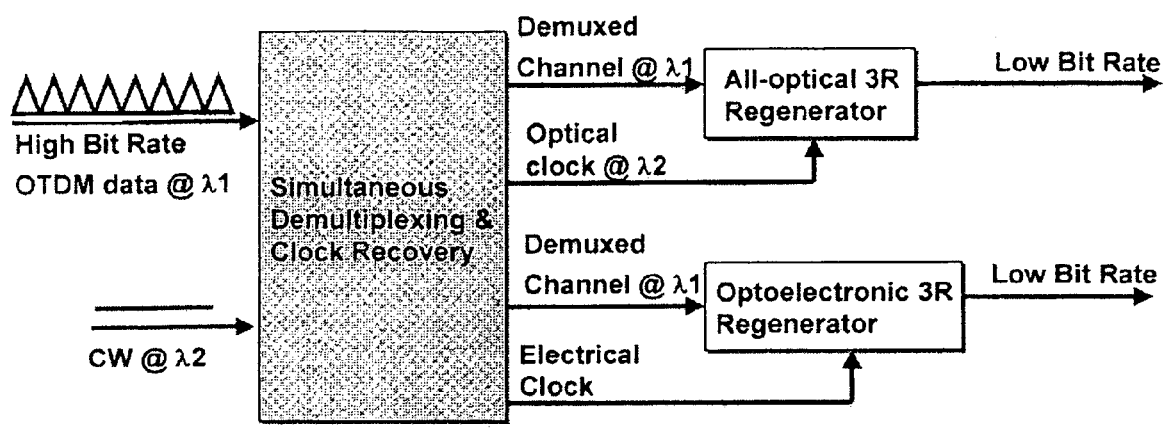
FIG. 1 is a schematic diagram for illustrating a general function of the invention.

FIG. 1 is a schematic diagram that illustrates a general function of the invention. The ability to convert all channels of a high-speed OTDM data stream to a low-speed data stream with correct synchronization is significant at a network node for future processing such as from core network to access network. Thus, the relatively low-speed and low-cost equipments can be used for switching and detection purposes even when an ultra-high speed OTDM data stream enters the node. Depending on the types of the 3R regenerators (all-optical or optoelectric), either generated optical clock or recovered electrical clock can be used.

Figure 2:
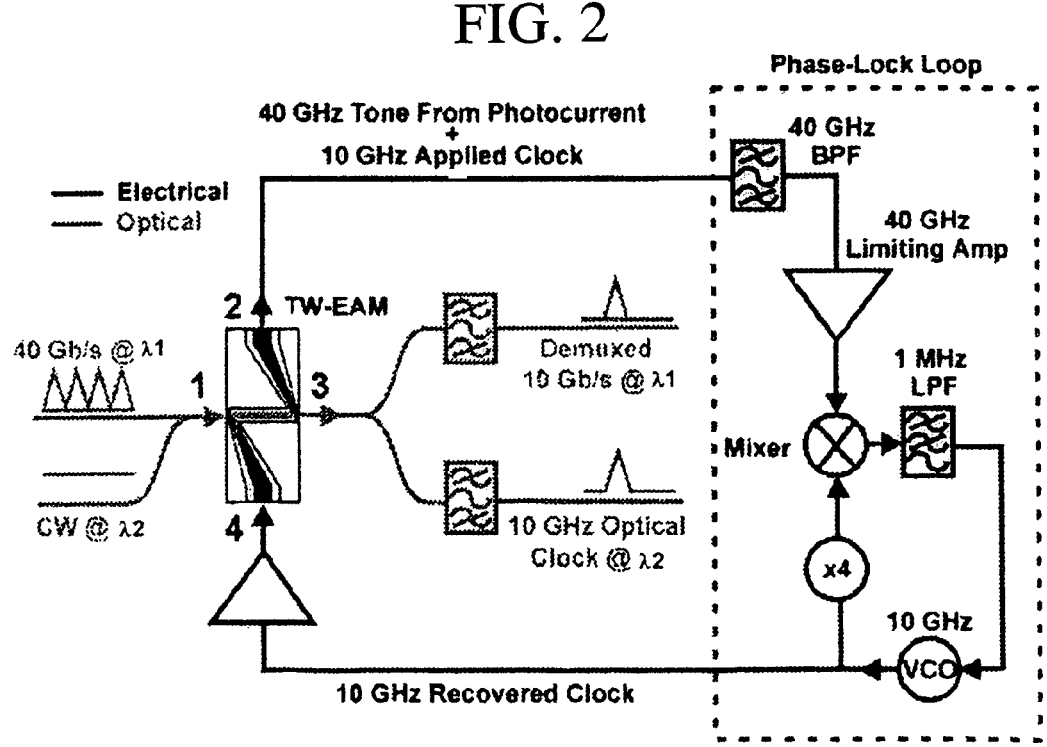
FIG. 2 is a schematic diagram for illustrating a basic configuration and principle of operation of one embodiment of the present invention.

Referring now to FIG. 2, the basic configuration and principle of operation of one embodiment of the present invention is illustrated. In the embodiment shown, a four-port TW-EAM is used. Port 1 and Port 3 are used for the optical input and output; Port 2 and Port 4 are used to extract the clock information from the photocurrent of the TW-EAM for the PLL operation and modulate the TW-EAM with the recovered electrical clock, respectively.

Figure 3:
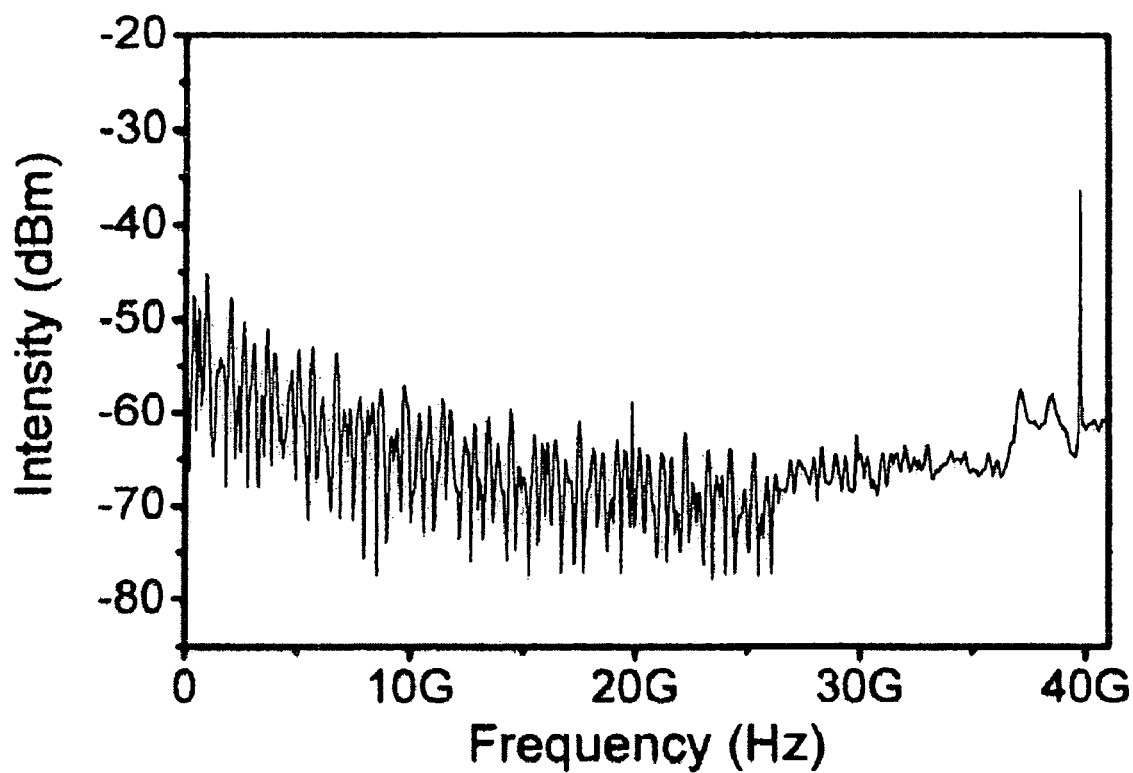
FIG. 3 is an RF spectrum of a photocurrent from TW-EAM under 40 Gb/s data input.

When a 40 Gb/s OTDM data stream with the wavelength $\lambda_1$ enters the TW-EAM, its information that is imposed as the intensity modulation is detected by the photocurrent of the TW-EAM, which is shown in FIG. 3. The 40 GHz tone in the photocurrent shown in FIG. 3 represents the information of the fundamental frequency of intensity modulation of the incoming optical 40 Gb/s data, including the phase. Then, it is extracted from the photocurrent by a 40 GHz RF band-pass filter (BPF) in a phase-lock loop (PLL) for 10 GHz electrical clock recovery. Afterwards, the electrical recovered clock is applied to drive the TW-EAM for OTDM demultiplexing after its phase adjustment and its RF power amplification. Simultaneously, 10 GHz optical clock with wavelength $\lambda_2$ is generated during the demultiplexing process when a CW light beam with $\lambda_2$ goes through the TW-EAM. It is desirable that the 10 GHz optical clock can be used to do 3R regeneration or whatever else at a lower bit rate for future processing.

Note that it is important that independent electrical frequency division is employed to achieve three co-existing functions in an TW-EAM without the crosstalk and the ambiguity, i.e., when the 10 GHz recovered electrical clock was used to modulate the TW-EAM for demultiplexing and optical clock generation, different frequency component of 40 GHz tone from the photocurrent was extracted for clock recovery by the PLL. Thus, although a mixed signal of 40 GHz and 10 GHz electrical signals enters the PLL, the 10 GHz clock can be easily removed by the narrowband 40 GHz BPF in the PLL. So, the TW-EAM works simultaneously as a photodetector, a demultiplexer, and an optical pulse generator.

Figure 4:
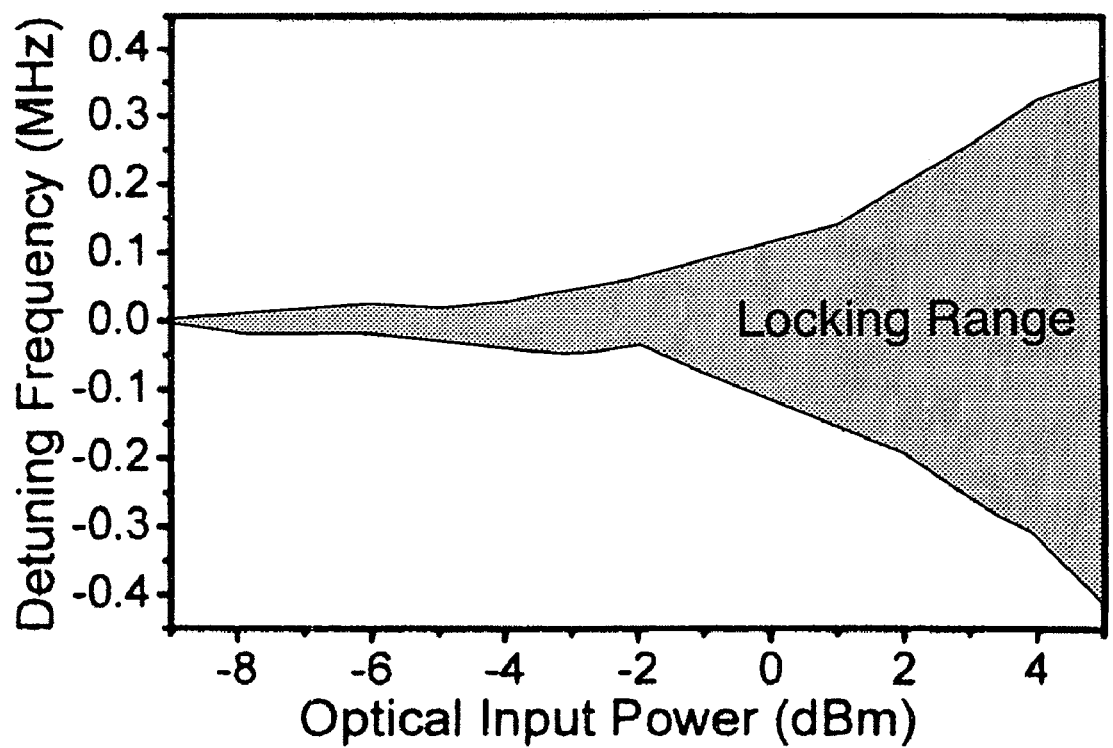
FIG. 4 shows a locking range under 40 Gb/s input.

The configuration shown in FIG. 2 and principle of operation described in connection with FIG. 2 represents the preferred embodiment of the invention. The locking range of the configuration was measured under 40 Gb/s data input, which is shown in FIG. 4. About 200 kHz locking range at 0 dBm optical input power and about 700 kHz at 5 dBm optical input power were obtained, respectively.

Figure 5:
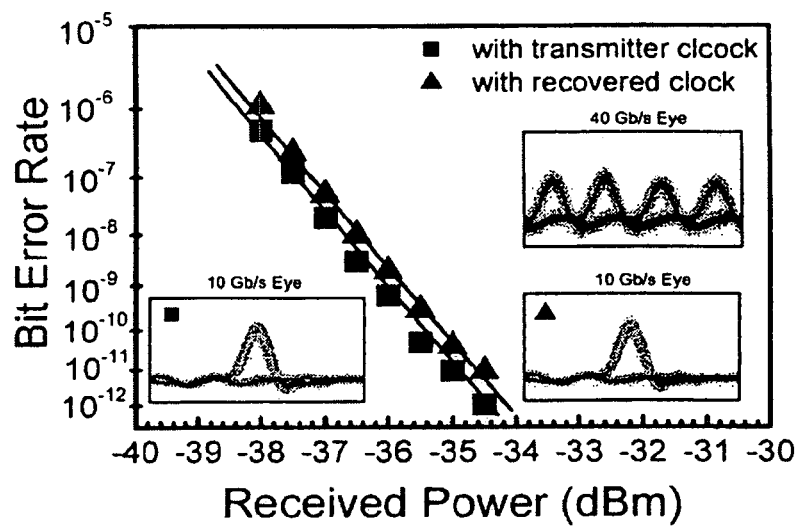
FIG. 5 shows bit-error-rate results with transmitter clock and recovered clock.

FIG. 5 shows the bit-error-rate (BER) curves and the eye diagrams. BER comparison is done by switching the 10 GHz electrical clock supplied to the TW-EAM and the BER tester from the transmitter clock (back-to-back) to the recovered electrical clock.

Figure 6A:
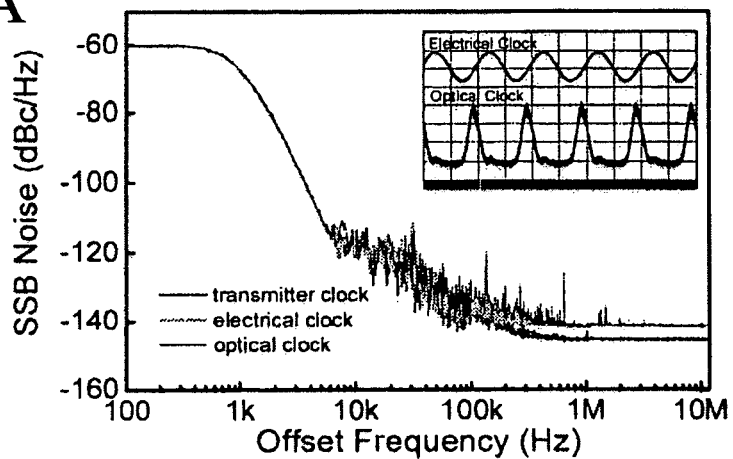
FIG. 6A shows single side band (SSB) noise spectra for transmitter clock, electrical recovered clock and generated optical clock.
Figure 6B:
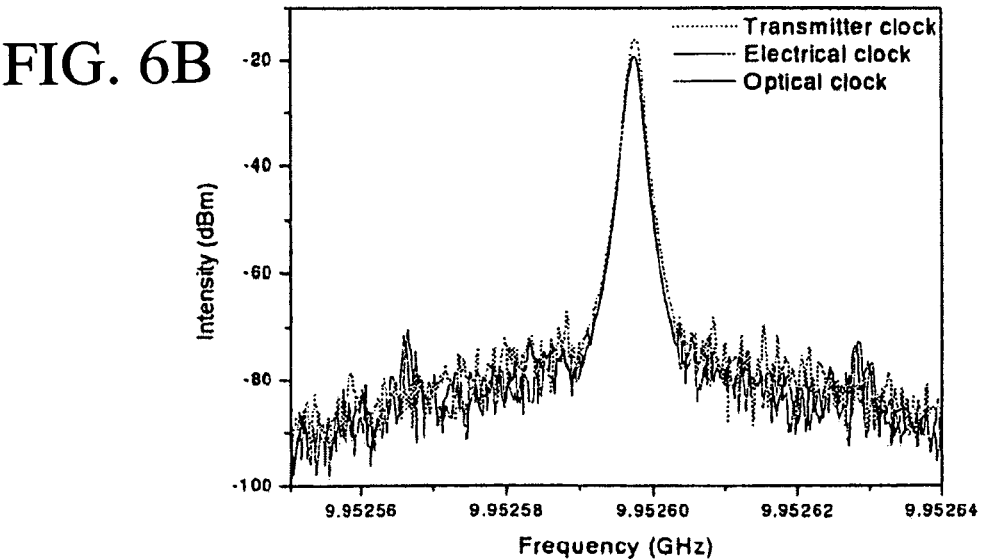
FIG. 6B shows a corresponding radio frequency (RF) spectrum at 1 kHz RBW (Resolution Bandwidth).

FIG. 6A shows single side band (SSB) noise spectra for transmitter clock, recovered electrical clock and generated optical clock. FIG. 6B shows a corresponding RF spectrum at 1 kHz resolution bandwidth (RBW). As shown in FIGS. 6A and 6B, total root mean square (RMS) jitter for the transmitter clock is 0.02731 rad, the electrical clock recovered from the PLL is 0.02757 rad and the generated optical clock is 0.02758 rad, respectively. It is obvious that the RMS jitter mainly comes from the transmitter clock. The inset waveforms in FIG. 6A show the 10 GHz recovered electrical clock and generated optical clock. The pulse width of the optical clock is about 14-ps.

Figure 7:
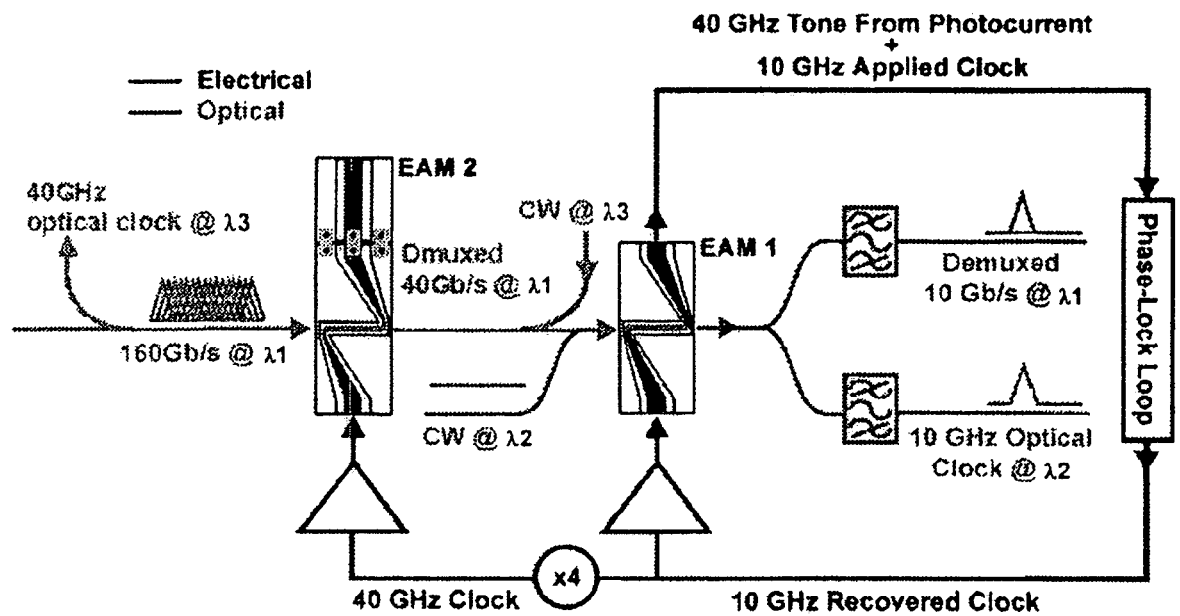
FIG. 7 shows a modified scheme for an application of ultra-high speed OTDM signals.

The limited bandwidth of the TW-EAM could restrict the application of the scheme to ultra-high speed OTDM system. However, when an assistant mechanism is introduced to intentionally produce the desired tones in the photocurrent, such as 40 GHz or 10 GHz, the scheme can be extended to ultra-high speed OTDM application. A possible assistant mechanism is to introduce another EAM that is used for demultiplexing the ultra-high speed OTDM signals to relatively low-speed OTDM signals that can be handled by the TW-EAM. For example, as shown in FIG. 7, an extra EAM (EAM 2) is added to demultiplex 160 Gb/s OTDM signals to 40 Gb/s and then the demultiplexed 40 Gb/s OTDM signals enter the TW-EAM (EAM 1). The dominated 40 GHz tone in the photocurrent of the TW-EAM is used by the PLL to recover 10 GHz electrical clock. The 10 GHz electrical recovered clock and its fourth times 40 GHz electrical clock are used to demultiplex 40 Gb/s and 160 Gb/s OTDM signals in the EAM 1 and EAM 2, respectively. When an extra CW light beam with wavelength $\lambda_2$ and with $\lambda_3$ enters the EAM 1 and EAM 2, respectively, both 10 GHz and 40 GHz optical clocks can be generated at the same time, which can be used to do 3R regeneration at a lower bit rate. Furthermore, in using counter-propagation scheme, the clock wavelength can even be the same as the OTDM data wavelength.

Figure 8:
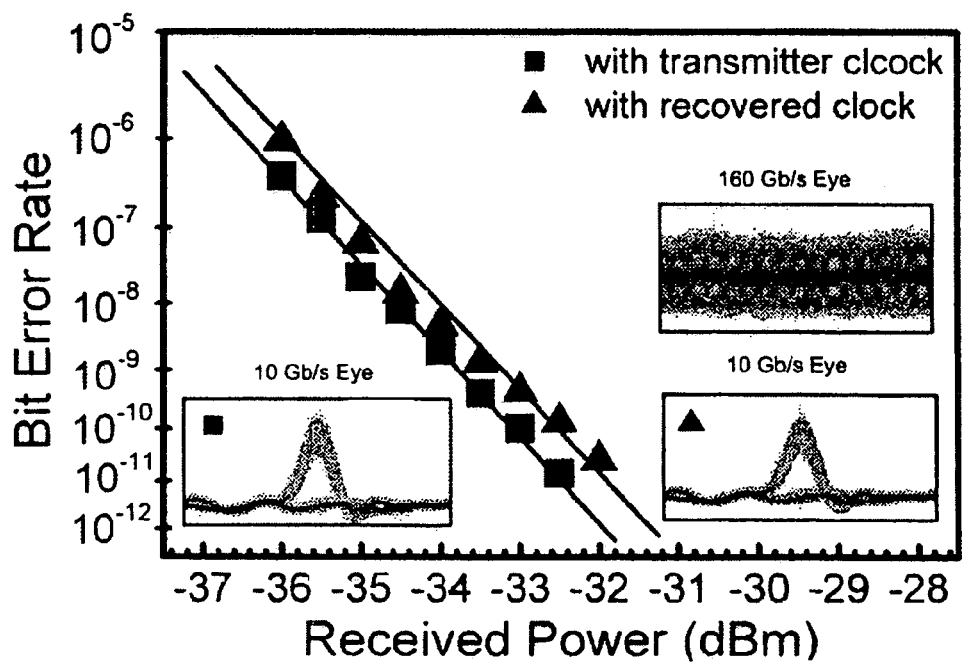
FIG. 8 shows bit-error-rate results with transmitter clock and recovered clock.

FIG. 8 shows the BER results of simultaneous demultiplexing and clock recovery for 160 Gb/s OTDM signals. Error free operation and as low as 0.5 dB power penalty were obtained, respectively.

Figure 9A:
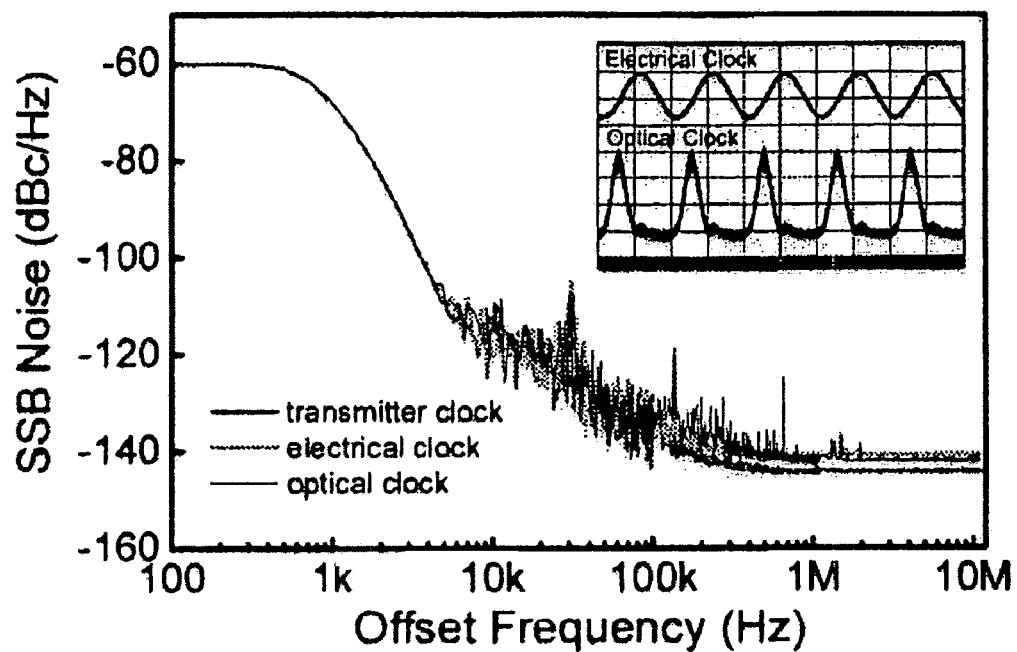
FIG. 9A shows SSB noise spectra for transmitter clock, electrical recovered clock and generated optical clock.
Figure 9B:
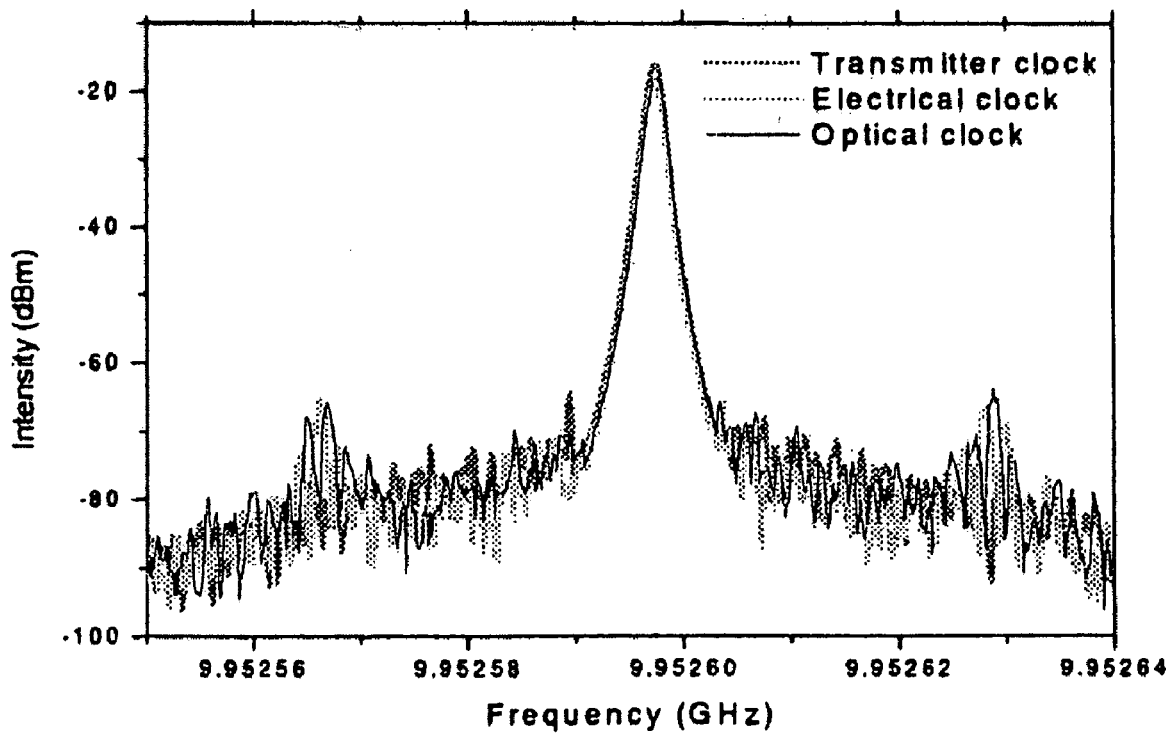
FIG. 9B shows a corresponding RF spectrum at 1 kHz resolution bandwidth (RBW).

FIG. 9A shows SSB noise spectra for transmitter clock, electrical recovered clock and generated optical clock. FIG. 9B shows a corresponding RF spectrum at 1 kHz RBW. As shown in FIGS. 9A and 9B, total RMS jitter for the transmitter clock is 0.02693 rad, the electrical clock recovered from the PLL is 0.02697 rad and the generated optical clock is 0.02715 rad, respectively. Also, it is obvious that the RMS jitter mainly comes from the transmitter clock. The inset waveforms in FIG. 9A show the 10 GHz recovered electrical clock and generated optical clock.

The present invention is advantageous since the TW-EAM can work simultaneously as a photodetector, a demultiplexer, and an optical pulse generator. Photocurrent of TW-EAM and independent frequency division make it feasible to achieve three co-existing functions in a TW-EAM without the crosstalk and the ambiguity.

Furthermore, the scheme can be extended to two aspects: (1) Although limited bandwidth of the TW-EAM restricts the bit rate increase of the incoming OTDM data stream, an assistant mechanism can be introduced to intentionally produce the desired tones in the photocurrent of the TW-EAM because it only reflects the intensity of the incoming OTDM data. Thus, the scheme can be extended to the application of ultra-high speed OTDM system. (2) More functionalities in a single TW-EAM can be achieved simultaneously when the dimensions of the TW-EAM such as bidirectionality and states of polarization are employed.

Figure 10:
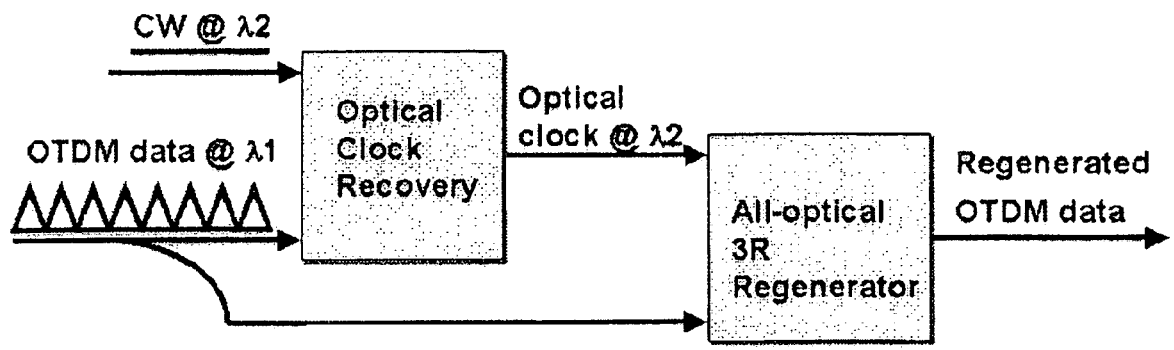
FIG. 10 is a schematic diagram for network architecture of one embodiment of the invention.

The invention presents another new scheme for optical clock recovery by combining a TW-EAM and a PLL. The generated optical clock has many applications, such as all-optical 3R regeneration. FIG. 10 shows the network architecture of one embodiment of the invention for all-optical 3R regeneration.

Figure 11:
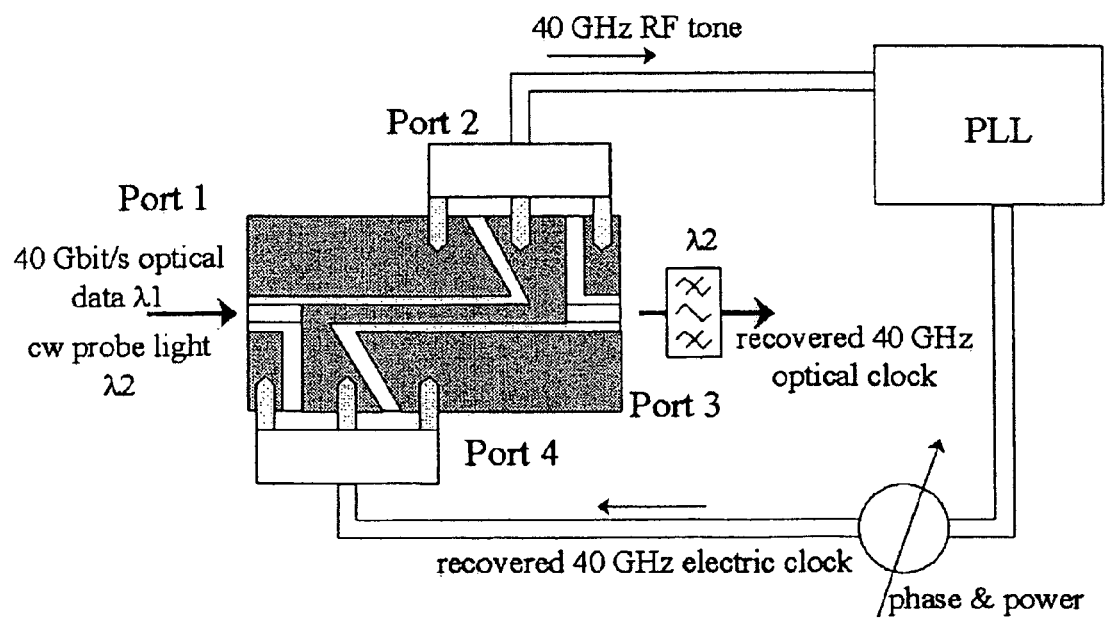
FIG. 11 is a schematic diagram for one preferred embodiment of the invention usin. g a four-port TW-EAM.

FIG. 11 is a schematic diagram for one preferred embodiment of the invention using a four-port TW-EAM, and shows a configuration and principle thereof. In this embodiment, Port 1 and Port 3 are used for the optical input and output; Port 2 and Port 4 are used to extract the data information from the photocurrent of the TW-EAM for the PLL operation and to modulate the TW-EAM with the recovered electrical clock, respectively.

Figure 12:
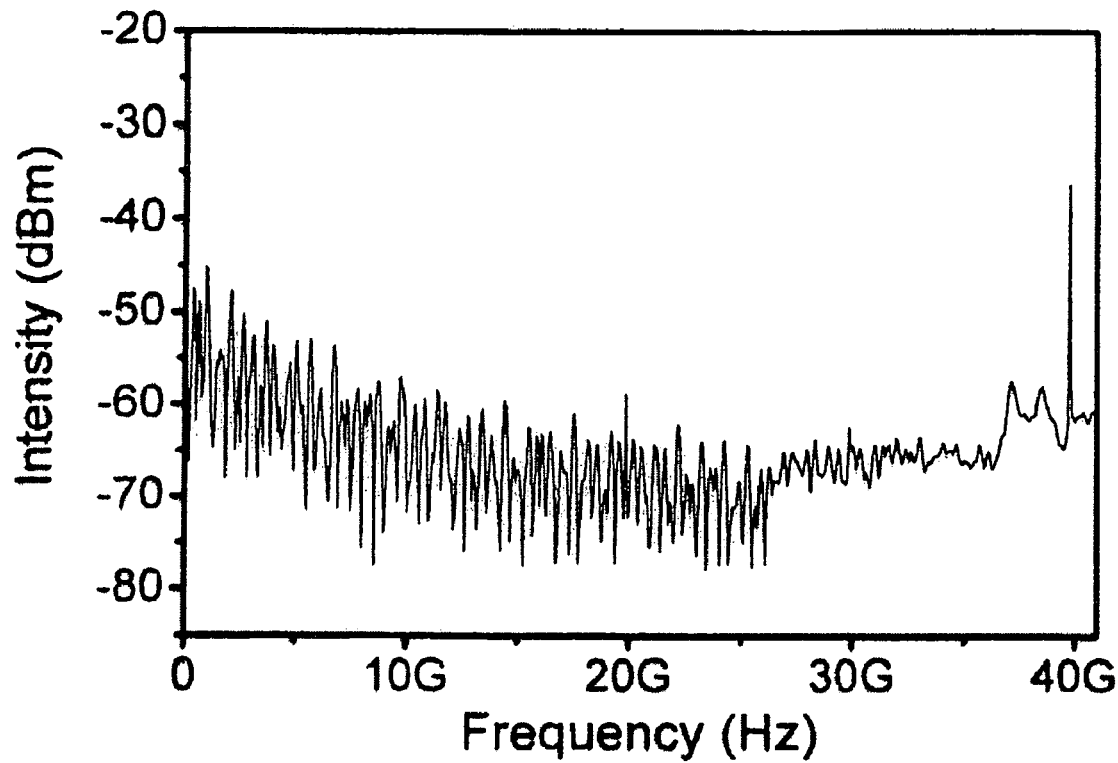
FIG. 12 shows an RF spectrum of a photocurrent from the TW-EAM under 40 Gb/s data input.

When a 40 Gb/s OTDM data stream with the wavelength $\lambda_1$ enters the TW-EAM, its information that is imposed as the intensity modulation is detected by the photocurrent of the TW-EAM. An RF spectrum of the photocurrent is shown in FIG. 12. The 40 GHz tone in the spectrum for the photocurrent shown in FIG. 12 represents the information of the fundamental frequency of intensity modulation of the incoming optical 40 Gb/s data, including the phase. Then, it is extracted from the photocurrent by a 40 GHz RF band-pass filter in a phase-lock loop (PLL) for 40 GHz electrical clock recovery. Afterwards, the 40 GHz electrical recovery clock is applied to modulate the TW-EAM after its phase adjustment and its RF power amplification. When a CW light beam with wavelength $\lambda_2$ goes through the TW-EAM, a 40 GHz optical clock with $\lambda_2$ is generated.

Figure 13:
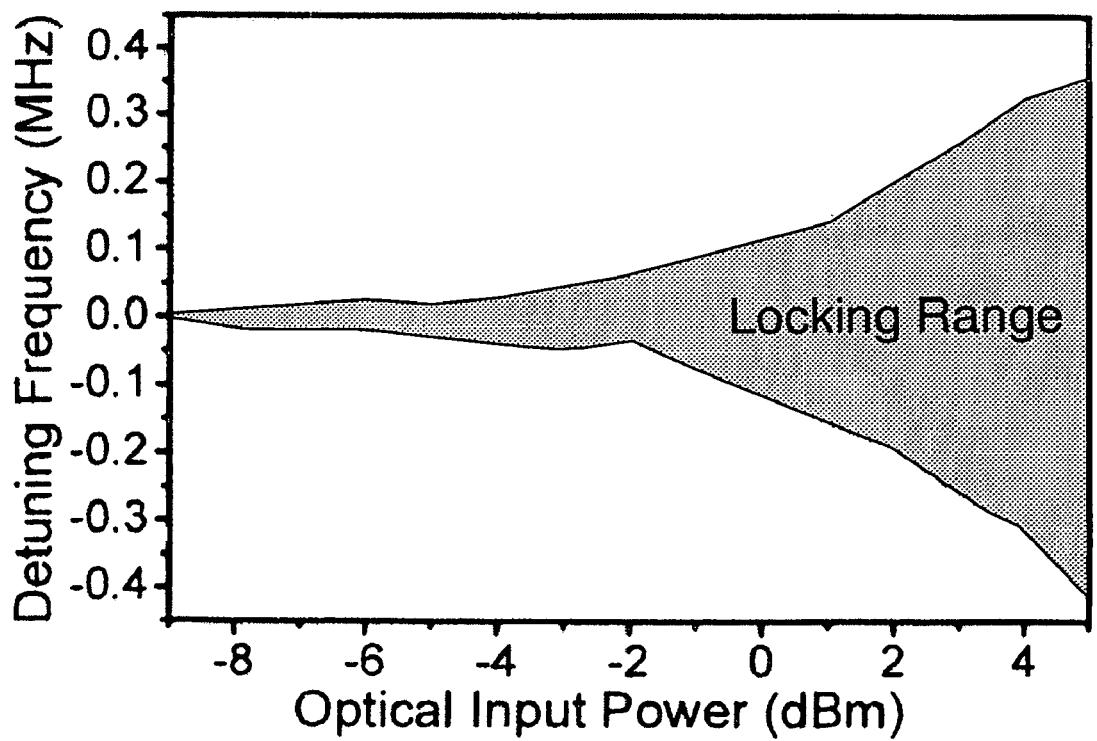
FIG. 13 shows a locking range under 40 Gb/s input.

The locking range of the configuration shown in FIG. 11 was measured for a 40 Gb/s data input, and the results are shown in FIG. 13. About 200 kHz locking range at 0 dBm optical input power and about 700 kHz at 5 dBm optical input power were obtained, respectively.

Figure 14:
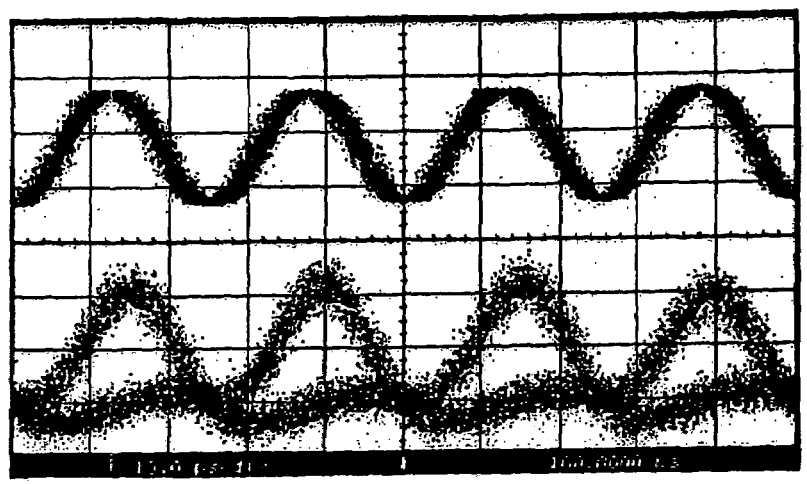
FIG. 14 shows a 40 GHz recovery electrical clock for 40 Gb/s OTDM data input.
Figure 15:
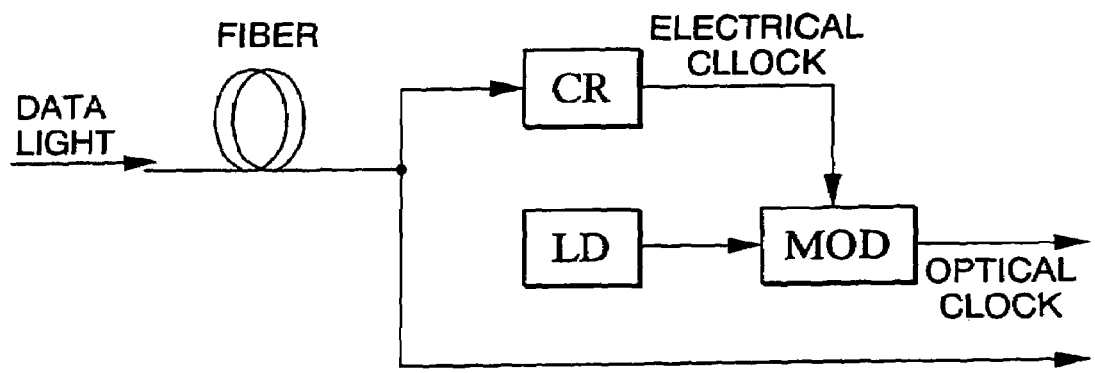
FIG. 15 shows a third example of the related art where discrete components for optical clock recovery are used.
Figure 16:
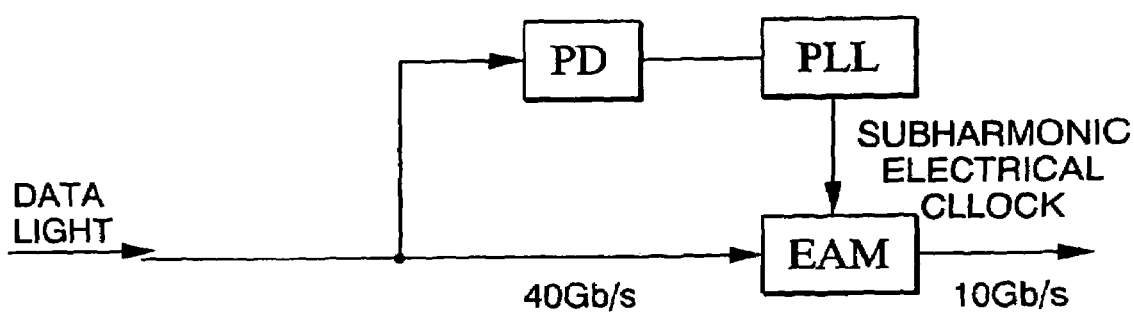
FIG. 16 shows a fourth example of the related art where discrete components for demultiplexed data recovery are used.

FIG. 14 shows a 40 GHz recovery electrical clock when 40 Gb/s OTDM data enters the configuration.

The invention is advantageous since the TW-EAM can work simultaneously as a photodetector and an optical pulse generator: (1) the photocurrent of the TW-EAM detects the data information which is then employed for recovering the electrical clock through the PLL; (2) the recovered electrical clock is fed to modulate the TW-EAM and generate an optical clock with another wavelength. Therefore, it is possible in the future to reduce the number of the required components for lightwave functions therefore substantially reducing the cost.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An apparatus for optical clock recovery, comprising:
   a traveling-wave electroabsorption modulator (TW-EAM) including a first port, a second port for producing a photocurrent, a third port, and a fourth port, the TW-EAM receiving optical time-division multiplexing (OTDM) data of a first bit rate with a first wavelength and a continuous wave optical signal with a second wavelength; and
   a phase-locked loop (PLL) including an input and an output, the input being connected to the second port of the TW-EAM, the output being connected to the fourth port,
   wherein the photocurrent includes a tone that is applied to the PLL to recover an electrical clock, and
   wherein the recovered electrical clock is supplied to the fourth port of the TW-EAM to modulate the TW-EAM and to generate an optical clock with the second wavelength.

2. The apparatus for optical clock recovery as recited in claim 1, wherein, when the OTDM data and the continuous wave optical signal are received at the first port, the optical clock is generated at the third port.

3. The apparatus for optical clock recovery as recited in claim 1, wherein, when the OTDM data is received at the first port and the continuous wave optical signal is received at the third port, respectively, the optical clock is generated at the first port.

4. The apparatus for optical clock recovery as recited in claim 1, wherein the tone includes a fundamental frequency, harmonics, and subharmonics.

5. The apparatus as recited in claim 1, wherein the optical clock is used for all optical 3R regeneration.

6. An apparatus for optical clock recovery, comprising:
   a traveling-wave electroabsorption modulator (TW-EAM) including a first port for receiving optical time-division multiplexing (OTDM) data of a first bit rate with a first wavelength and a continuous wave optical signal with a second wavelength, a second port for producing a photocurrent, a third port, and a fourth port; and
   a phase-locked loop (PLL) including an input and an output, the input being connected to the second port of the TW-EAM, the output being connected to the fourth port,
   wherein the photocurrent includes a tone of a fundamental frequency determined by the first bit rate that is applied to the PLL to recover an electrical clock with a same frequency as the fundamental frequency, and
   wherein the recovered electrical clock is supplied to the fourth port of the TW-EAM to generate, at the third port, an optical clock with a same frequency as the fundamental frequency.

7. The apparatus for optical clock recovery as recited in claim 6, wherein the tone further includes harmonics and subharmonics.

* * * * *